No. 873,875. PATENTED DEC. 17, 1907.
J. LINGAAS.
ORCHARD CULTIVATOR.
APPLICATION FILED MAR. 25, 1907.
Fig. 1.
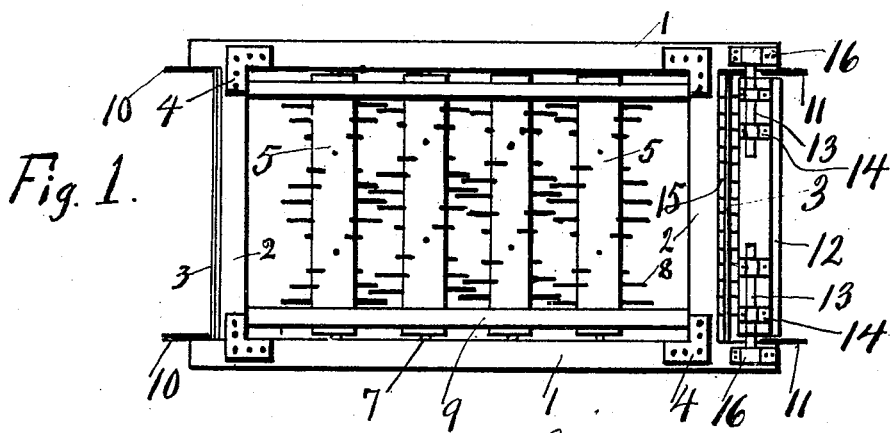
Fig. 2.
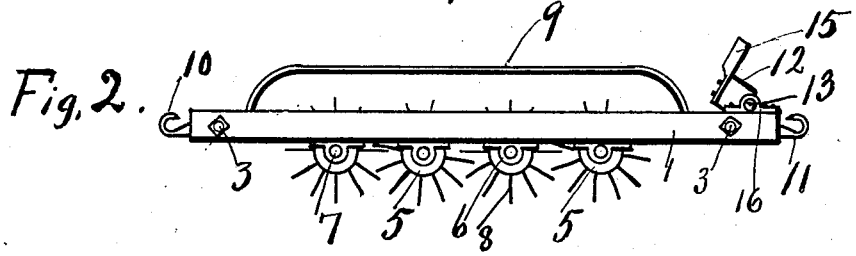
Fig. 3.
Fig. 4.
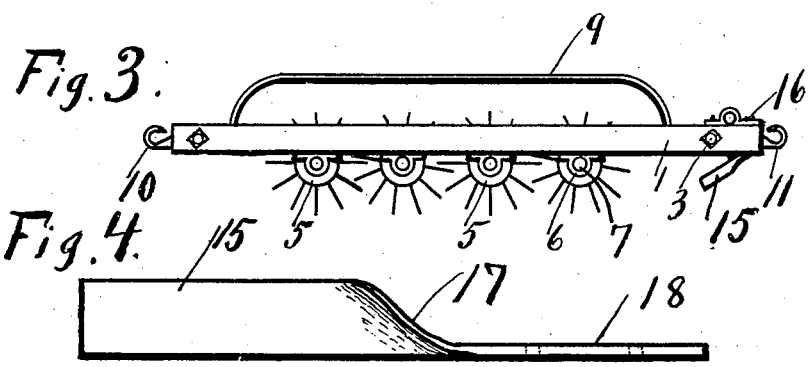
Witnesses:
Herbert B. Ward
L. E. Brown.
Inventor:
Jens Lingaas.
Carlos P. Griffin his Atty.

UNITED STATES PATENT OFFICE.

JENS LINGAAS, OF SAN FRANCISCO, CALIFORNIA.

ORCHARD-CULTIVATOR.

No. 873,875.　　　Specification of Letters Patent.　　　Patented Dec. 17, 1907.

Application filed March 25, 1907. Serial No. 364,320.

*To all whom it may concern:*

Be it known that I, JENS LINGAAS, a citizen of Norway, and residing in the city and county of San Francisco, State of California, have made certain new and useful Improvements in Orchard-Cultivators, of which the following is a specification in such full and clear terms as will enable those skilled in the art to which it appertains to construct and use the same.

The object of this invention is to produce a cultivator that will be effective and will be as simple as is consistent with the work to be done.

A further object of the invention is to make a cultivator that may be used on ground that is very rough or on ground that is comparatively smooth with substantially the same effect, the cultivator in the first instance cutting the ground very considerably, while in the second instance it cuts it but very little and loosens it very considerably.

A further object of the invention is to make these changes with as little trouble as possible.

A further object of the invention is to make a cultivator that may be pulled by the team over solid ground without injuring the teeth of the same, by simply turning the cultivator over.

Other objects of the invention will appear as the description proceeds.

In the drawings, in which like numerals of reference refer to like parts throughout, Figure 1 is a plan of the machine, Fig. 2 is a side elevation of the same with the clod breaker turned up out of use, Fig. 3 is a side elevation of the cultivator with the clod breaker turned down, and Fig. 4 is a side view of one of the knives carried by the clod breaker on a larger scale.

The cultivator is provided with side rails 1 and end rails 2 which are fastened together by the rod 3 at each end. In order that the frame may be more securely joined together the angle plates 4 are provided at each corner of the frame, said plates being bolted to the side and end rails.

The teeth which tear up the ground are carried by a series of four rollers numbered 5, each roller being provided with a gudgeon 7 at each end which is journaled in the boxes 6 carried by the side rails 1. These rollers are free to turn in any direction, or to move longitudinally, within the limits set by the side rails 1, and the rollers are provided with spirally set teeth 8.

In order to take the cultivator from place place it is advisable to provide means to prevent it from being injured by hard ground, and also to prevent it from cutting up ground which is not intended to be cut up. This means is the sled runners 9 on which the cultivator may be carried whenever it may be necessary to move the same from place to place.

As above described the cultivator is effective in ground that does not require very heavy treatment to break it up, but where the ground is very cloddy it is necessary to provide additional means to break the clods before the toothed rollers 5 will do very good work. This additional means for breaking cloddy ground is the bar 12 which is hung at one end of the frame by means of the two shafts 13, said shafts being secured to the bar by means of the straps 14. This bar is pivoted in the boxes 16 carried by each side rail 1 near one end thereof, and it is free to turn about the shafts as an axis. The bar is provided with knives 15 which are twisted at 17, as shown in Fig. 4, to such an extent that one part of them lies in a plane at 90 degrees with the remaining part 18 through which the holes are drilled to secure them to the bar 12.

Now it will be observed that the machine may be pulled in either direction by the team, hooks 10 being provided at one end and hooks 11 being provided at the opposite end of the frame. Now it will be apparent that the bar 12 being free to turn about the shafts 13 that when the cultivator is pulled in one direction that it will not cut the ground at all but will drag behind, or it may be turned up, as shown in Fig. 2, out of the way. Where the ground is very rough the team may be hooked on at the opposite end to the hooks 11, when the bar is turned down to the position shown in Fig. 3. The bar cannot turn completely over for the reason that it comes against the rod 3 leaving the knives 15 projecting down in an inclined direction. It will be noticed that in this position that it is practically impossible for any weeds to collect on the knives, and they are placed so near together that they cut any clod that may be in the way small enough to make it certain that the rollers 5 will act to stir the ground well.

Having described my invention in such full and clear terms as will enable those skilled in the art to which it appertains to construct and use the same, what I claim as new and desire to secure by Letters Patent of the United States is:

In a cultivator adapted to be pulled in either direction, the combination of a rectangular frame, a series of toothed rollers loosely journaled therein, a square bar carried by journals on the top of the frame, teeth carried by said bar, and a stop bar so placed as to permit the square bar to turn up above the frame and also to act as a stop bar when the square bar has been turned so its teeth point downwardly.

In testimony whereof I have hereunto set my hand this 18th day of March A. D. 1907, in the presence of the two subscribing witnesses.

JENS LINGAAS.

Witnesses:
C. P. GRIFFIN,
HENRY P. TRICOU.